United States Patent
Choi et al.

(10) Patent No.: US 9,787,237 B2
(45) Date of Patent: Oct. 10, 2017

(54) FAULT TOLERANT CONTROL SYSTEM FOR MULTI-PHASE PERMANENT MAGNET ASSISTED SYNCHRONOUS RELUCTANCE MOTORS

(71) Applicants: Seungdeog Choi, Akron, OH (US); AKM Arafat, Akron, OH (US)

(72) Inventors: Seungdeog Choi, Akron, OH (US); AKM Arafat, Akron, OH (US)

(73) Assignee: The University of Akron, Akron, OH (US)

( * ) Notice: Subject to any disclaimer, the term of this patent is extended or adjusted under 35 U.S.C. 154(b) by 0 days.

(21) Appl. No.: 14/797,940

(22) Filed: Jul. 13, 2015

(65) Prior Publication Data

US 2016/0028343 A1   Jan. 28, 2016

Related U.S. Application Data

(60) Provisional application No. 62/023,333, filed on Jul. 11, 2014.

(51) Int. Cl.
| | |
|---|---|
| *H02P 25/22* | (2006.01) |
| *H02P 25/08* | (2016.01) |
| *H02P 29/032* | (2016.01) |

(52) U.S. Cl.
CPC ............ *H02P 25/08* (2013.01); *H02P 25/22* (2013.01); *H02P 29/032* (2016.02)

(58) Field of Classification Search
CPC ......... H02P 25/08; H02P 29/028; H02P 25/22
See application file for complete search history.

(56) References Cited

U.S. PATENT DOCUMENTS

| | | | |
|---|---|---|---|
| 2009/0033156 A1* | 2/2009 | Chakrabarti | B60L 11/1887 307/82 |
| 2011/0080000 A1* | 4/2011 | Cullen | H02K 3/28 290/31 |
| 2011/0221366 A1* | 9/2011 | Gallegos-Lopez | H02P 21/06 318/400.02 |
| 2012/0286587 A1* | 11/2012 | Zhou | H02H 7/263 307/113 |

* cited by examiner

*Primary Examiner* — Shawki S Ismail
*Assistant Examiner* — Muhammad S Islam
(74) *Attorney, Agent, or Firm* — Renner, Kenner, Greive, Bobak, Taylor & Weber Co. LPA

(57) ABSTRACT

A fault tolerant control system for a multi-phase permanent magnet assisted synchronous reluctance motor utilizes vector control to provide safe operation under various phase loss fault conditions. Specifically, the vector control of the present invention utilizes a fault tolerant algorithm that receives a torque input and an electrical current feedback signal from the motor. Thus, in the presence of a fault condition, the vector control applies the optimal torque angle to the motor, while reducing the phase currents to an optimized value to lessen the saturation effect in the motor, so as to ensure that the motor delivers maximum torque output in the presence of such faults. As such, the control system allows the motor to operate safely with high reliability, which is highly desirable, such as in electric vehicles and the aerospace industry.

13 Claims, 18 Drawing Sheets

| Single Phase Fault | Two Phase Fault (adjacent) | Two Phase Fault (non-adjacent) |
|---|---|---|
| $L = \begin{bmatrix} L_{aa} & L_{ab} & L_{ac} & L_{ad} & L_{ae} \\ L_{ba} & L_{bb} & L_{bc} & L_{bd} & L_{be} \\ L_{ca} & L_{cb} & L_{cc} & L_{cd} & L_{ce} \\ L_{da} & L_{db} & L_{dc} & L_{dd} & L_{de} \\ L_{ea} & L_{eb} & L_{ec} & L_{ed} & L_{ee} \end{bmatrix}$ | $L = \begin{bmatrix} \cancel{L_{aa}} & \cancel{L_{ab}} & \cancel{L_{ac}} & \cancel{L_{ad}} & \cancel{L_{ae}} \\ L_{ba} & L_{bb} & L_{bc} & L_{bd} & L_{be} \\ L_{ca} & L_{cb} & L_{cc} & L_{cd} & L_{ce} \\ L_{da} & L_{db} & L_{dc} & L_{dd} & L_{de} \\ \cancel{L_{ea}} & \cancel{L_{eb}} & \cancel{L_{ec}} & \cancel{L_{ed}} & \cancel{L_{ee}} \end{bmatrix}$ | $L = \begin{bmatrix} L_{aa} & L_{ab} & L_{ac} & L_{ad} & L_{ae} \\ \cancel{L_{ba}} & \cancel{L_{bb}} & \cancel{L_{bc}} & \cancel{L_{bd}} & \cancel{L_{be}} \\ L_{ca} & L_{cb} & L_{cc} & L_{cd} & L_{ce} \\ L_{da} & L_{db} & L_{dc} & L_{dd} & L_{de} \\ \cancel{L_{ea}} & \cancel{L_{eb}} & \cancel{L_{ec}} & \cancel{L_{ed}} & \cancel{L_{ee}} \end{bmatrix}$ |

FIG – 14

FAULT TOLERANT CONTROL SYSTEM FOR MULTI-PHASE PERMANENT MAGNET ASSISTED SYNCHRONOUS RELUCTANCE MOTORS

CROSS-REFERENCE TO RELATED APPLICATION

This application claims the benefit of U.S. Provisional Application No. 62/023,333 filed Jul. 11, 2014, the contents of which are incorporated herein by reference.

TECHNICAL FIELD

Generally, the present invention relates to control systems for multi-phase synchronous reluctance motors. Particularly, the present invention relates to a fault tolerant control system for multi-phase synchronous reluctance motors. More particularly, the present invention relates to a fault tolerant control system for multi-phase synchronous reluctance motors that optimize the amplitude and angle of the phase currents applied to the motor, so as to maximize the amount of torque that the motor can generate when one or more motor phases are under a fault condition.

BACKGROUND OF THE INVENTION

A substantial amount of research has been performed to develop a reliable control for an electric motor or machine for use in critical service applications, such as in medical, military, and transportation applications. For example, in transportation applications where high reliability is required to maintain safety, hybrid and electric vehicles have begun to be widely used. In order to maximize the fault tolerance capabilities and minimize the cost of such electric devices, including electric transportation systems, the use of multi-phase motor systems have been investigated. Due to their high number of phases, multi-phase motor systems are desirable due to their ability to continue to operate and provide a significant amount of torque even in the case when one or more phases are lost or made operational due to a fault condition.

Among the many types of multiphase motors, permanent magnet assisted synchronous reluctance motors (PMa-SynRM) have been considered as one of the most promising motor technologies due to its many benefits, including its robust control and low-cost design. In particular, the five phases of the PMa-SynRM utilizes the features of both synchronous reluctance machines (RSM) and permanent magnet synchronous machines (PMSM) to improve its torque producing characteristics. Furthermore, in PMa-Syn-RMs, the number of permanent magnets that are used is reduced, as compared with other types of PMSMs, and as a result, the overall cost of the PMa-SynRM is reduced. Moreover, due to the presence of reluctance torque, the control strategy of PMa-SynRM motors can also be enhanced to optimize the torque that is able to be provided in the event of a fault condition.

As such, it would be desirable to develop a control system that can further enhance the operation of the multi-phase permanent magnet assisted synchronous reluctance motor (PMa-SynRM), so as to include various operational advantages, including a reduction of torque pulsation, reduction of stator current per phase without increasing the voltage per phase, improving the torque per ampere, reducing the DC link current harmonics, while also offering higher reliability. These characteristics support the use of multi-phase motors/ machines as an excellent candidate for greater fault tolerant operation in vehicular and military applications.

In order to sustain reliable operation of such PMa-SynRM motors, control methods are required to respond in an appropriate manner when the motor experiences a detected fault, while maintaining an acceptable level of motor control performance. As such, several strategies have been previously evaluated for reliable fault tolerant control of such multi-phase machines or motors. For example, some control techniques utilize a control system that includes redundant phases in the inverter side or additional machines/motors in parallel to continue motor operation when one motor experiences a fault, which is not cost effective. In addition, significant research has taken place to develop a control scheme that maintains the same amount of total current prior to a motor fault and after the occurrence of a motor fault. For example, one strategy that has been considered involved providing more phase current (200%-300% for two phase faults) in the healthy phases, while disconnecting the faulty phase. However, by increasing the phase current significantly may cause critical machine/motor parameters of the PMa-SynRM to change, such as inductance, which is prone to going into the saturation region. Furthermore, the operation of the PMa-SynRM motor with such increased phase currents may lead to decreased torque, lowered efficiency, and increased operating temperature, etc. Also, the higher amount of phase current that is to be applied to the motor requires it to have a higher rated design, which may not be cost effective. Moreover, under such conditions, the motor would not be capable of being operated for a long duration. Still, other strategies have been evaluated to reduce the torque ripple of the PMa-SynRM while considering the very low average torque (~83% reduction) under a two-phase fault condition. However, the application of this technique is limited where priority is given to obtain higher torque.

Therefore, there is a need for a fault tolerant control system for a permanent magnet assisted synchronous reluctance motor (PMa-SynRM), whereby the amplitude (less than about 150%) and angle of the phase currents applied to the motor are optimized using a computer simulation, such as a MATLAB simulation, to maximize the torque output by the motor. In addition, there is a need for a fault tolerant control system for a permanent magnet assisted synchronous reluctance motor (PMa-SynRM) that adjusts the phase advance (i.e. the offset between rotor position and the stator current reference) to provide optimal and sustainable torque when the motor is under various fault conditions. Furthermore, there is a need for a fault tolerant control system for a permanent magnet assisted synchronous reluctance motor (PMa-SynRM) that enables various operational advantages, including a reduction of torque pulsation, a reduction of stator current per phase without increasing the voltage per phase, an improvement of the torque per ampere, a reduction of the DC link current harmonics, and an increase in reliability.

SUMMARY OF THE INVENTION

In light of the foregoing, it is a first aspect of the present invention to provide a method for controlling a multi-phase permanent magnet assisted synchronous reluctance motor comprising simulating the operation of the multi-phase permanent magnet assisted synchronous reluctance motor having at least one phase with a fault and having at least one healthy phase; adjusting a phase current amplitude value and a phase current angle value that is applied to at least one healthy motor phase; monitoring the torque of the multiphase permanent magnet assisted synchronous reluctance motor during the adjusting step; identifying the phase current amplitude value and the phase current angle value of the at least one healthy motor phase that delivers maximum torque; and applying the phase current amplitude value and the phase current angle value to the multi-phase permanent magnet assisted synchronous reluctance motor.

Yet another aspect of the present invention is a control system for a multi-phase permanent magnet assisted synchronous reluctance motor having at least one phase under a fault condition and having at least one healthy phase, the motor being controlled by a pulse-width modulation (PWM) inverter component, the control system comprising a speed controller to receive a speed setting signal, the speed controller adapted to be coupled to the motor to monitor the speed of the motor; a torque calculation component coupled to the speed controller; a fault tolerant algorithm component coupled to the torque calculation component, the fault tolerant algorithm component adapted to be coupled to the PWM inverter component; and a current sensor coupled to the fault tolerant component, the motor current sensor adapted to be coupled to the motor; wherein the fault tolerant algorithm component receives a torque setting signal from the torque calculation component and a current signal from the current sensor that identifies the current consumed by the motor, the fault tolerant algorithm component adjusts a vector control signal applied to the PWM inverter component, which includes an optimized torque angle signal and an optimized phase current signal that are applied to the at least one healthy phase, so as to control the motor to deliver maximum torque output during the fault.

BRIEF DESCRIPTION OF THE DRAWINGS

These and other features and advantages of the present invention will become better understood with regard to the following description, appended claims, and accompanying drawings wherein:

FIG. 14 is a graph showing an inductance matrix under different fault conditions.

DETAILED DESCRIPTION OF THE INVENTION

The present invention provides a control system for a multi-phase permanent magnet assisted synchronous reluctance motor (PMa-SynRM). It should be appreciated that for the purposes of the following discussion, the multi-phase permanent magnet assisted synchronous reluctance motor (PMa-SynRM) includes five-phases, however the control system of the present invention may be used with a multi-phase permanent magnet assisted synchronous reluctance motor (PMa-SynRM) having any number of phases. Before discussing the details of the PMa-SynRM motor control system of the present invention, a brief introduction to the operation and mathematical representation of the operating parameters of the PMa-SynRM motor will be presented to facilitate the understanding of the reader.

1. Five-Phase Motor Model Under Fault Conditions

Figure 1C:
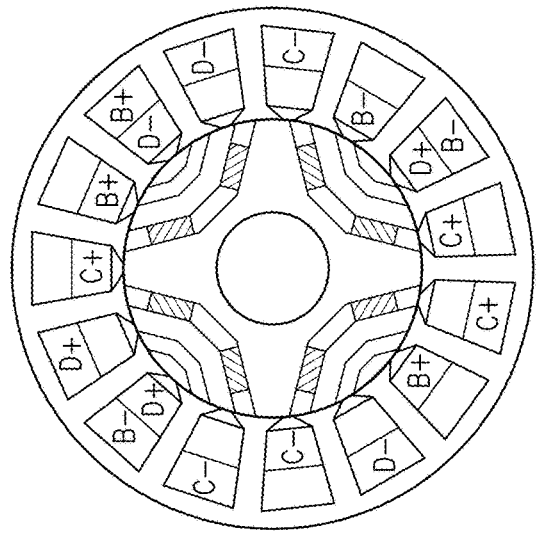
FIG. 1C is a schematic diagram of the FEA model of the five-phase PMa-SynRM motor under a two-phase adjacent fault.
Figure 1B:
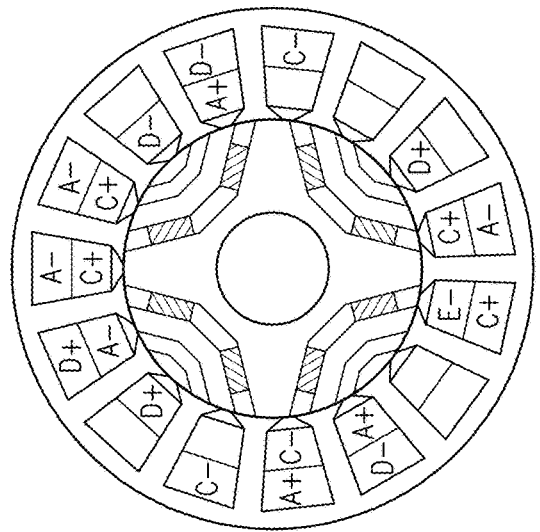
FIG. 1B is a schematic diagram of a FEA model of the five-phase PMa-SynRM motor under a two-phase non-adjacent fault.
Figure 1A:
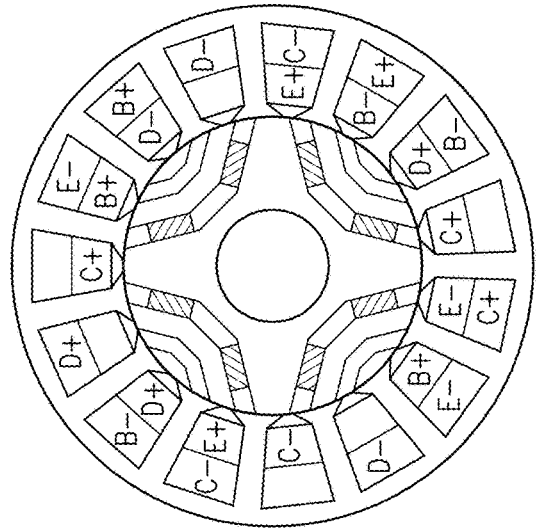
FIG. 1A is a schematic diagram of a finite element analysis (FEA) model of a five-phase permanent magnet assisted synchronous reluctance motor/machine (PMa-SynRM) under a single-phase fault.

To evaluate the control system of the present invention, an FEA (finite element analysis) model of a faulty multi-phase permanent magnet assisted synchronous reluctance motor (PMa-SynRM) motor/machine is presented using ANSYS Maxwell. In particular, there are 2 types of potential phase fault conditions that a five-phase PMa-SynRM motor system can experience, single-phase and two-phase open faults. In particular, such single-phase and two-phase faults significantly alter the torque production capability of the five-phase system. Having more than two-phase faults is theoretically not sustainable, and as such, is not considered by the control system of the present invention. Based on the symmetry of a five-phase PMa-SynRM motor, two-phase faults can be further categorized as being an adjacent phase fault or a non-adjacent phase fault. FIGS. 1A-C show examples of an FEA fault model of the five-phase PMa-SynRM motor for use with the control system contemplated by the present invention under different fault conditions. To calculate the electromagnetic torque under normal motor operating conditions and under different motor fault conditions, the FEA simulation has been conducted under about 1800 RPMs with full excitation with those models, as shown in FIG. 1.

2. Mathematical Model of the Five-Phase PMa-SynRM

The mathematical model equations of a five-phase motor are derived in reference to a d-q rotating reference frame. The stator voltages and machine/motor equations are given by the following: $V_d = -\omega_r(L_q \cdot I_q - \lambda_{PM})$, $V_q = \omega_r(L_d \cdot I_d)$, Eq. (1), where $V_d$ and $I_d$ is the d-axis voltage and current; $V_q$ and $I_q$ is the q-axis voltage and current, $L_d$ is the d-axis inductance, $L_q$ is the q-axis inductance, and $\lambda_{PM}$ is the permanent magnet flux linkage. It should also be appreciated that Eq. (1) when considering the winding voltage drop, the transient and steady state equations are set forth as follows: $V_d = R_a I_d + pL_d I_d - \omega_r L_q \cdot I_q + \omega_r \lambda_{PM}$, $V_q = R_a I_q + pL_q I_q + \omega_r L_d \cdot I_d$. Due to having five mutual flux linkages in the five-phase motor/machine and the presence of saliency in the rotor construction of the motor, there is a need to develop a generalized transformation matrix, which can be used during normal and fault operation calculations, which is given by Eq. (2) below $$T(\theta) = J \begin{bmatrix} A\cos\theta & B\cos\left(\theta - \frac{2\pi}{5} + P_b\frac{\pi}{5}\right) & C\cos\left(\theta - \frac{4\pi}{5} + P_c\frac{4\pi}{15}\right) & D\cos\left(\theta - \frac{6\pi}{5} + P_d\frac{7\pi}{18}\right) & E\cos\left(\theta + \frac{2\pi}{5} + P_e\frac{\pi}{5}\right) \\ A\sin\theta & B\sin\left(\theta - \frac{2\pi}{5} + P_b\frac{\pi}{5}\right) & C\sin\left(\theta - \frac{4\pi}{5} + P_c\frac{4\pi}{15}\right) & D\sin\left(\theta - \frac{6\pi}{5} + P_d\frac{7\pi}{18}\right) & E\sin\left(\theta + \frac{2\pi}{5} - P_e\frac{7\pi}{18}\right) \\ \frac{A}{\sqrt{2}} & \frac{B}{\sqrt{2}} & \frac{C}{\sqrt{2}} & \frac{D}{\sqrt{2}} & \frac{E}{\sqrt{2}} \end{bmatrix}.$$

As such, J is $2/(A+B+C+D+E)$, while A, B, C, D, and E represent the fault existence and $P_a$, $P_b$, $P_d$, and $P_e$ represent the phase changes under fault conditions. Under normal conditions, $A=B=C=D=E=1$, otherwise, each of them are zero (0) under fault conditions. Under normal conditions, $P_a=P_b=P_c=P_d=P_e=0$, otherwise each of them are not zero under fault conditions. The P parameter has been chosen to establish the common format of the transformation matrix only by changing it. In the present invention, each of these parameters is optimized, which will be discussed in detail below. By utilizing the transformation matrix of Eq. (2), the d and q-axis components can be found under all fault conditions, which will be utilized for analysis in the following discussion.

The general electro-magnetic torque of a five-phase PMa-SynRM motor can be derived as.

$$T_e = \frac{5P}{4}[\lambda_d I_q - \lambda_q I_d] = \frac{5P}{4}[\lambda_{PM} I_d + (L_d - L_q)I_d I_q], \quad \text{Eq. (3)}.$$

Figure 2:
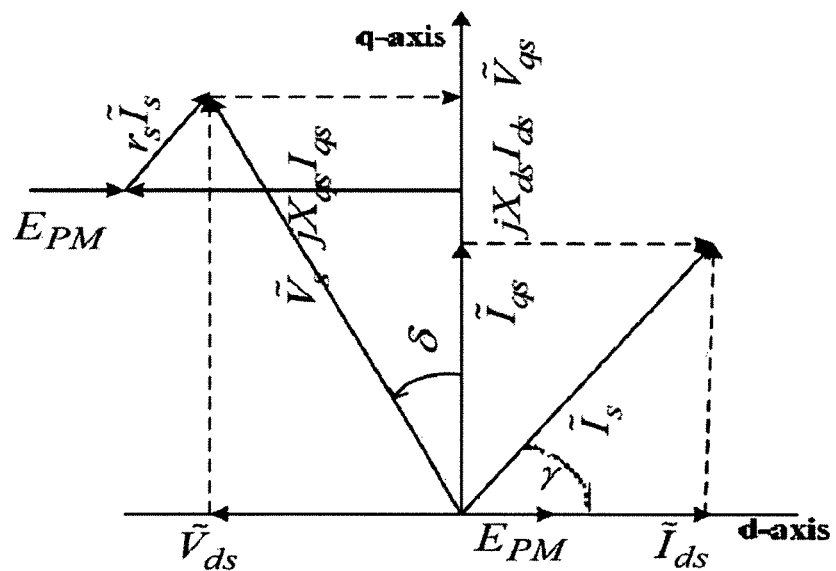
FIG. 2 is a vector diagram of the mathematical model of the five-phase PMa-SynRM motor to be controlled in accordance with the concepts of the present invention.

As such, p is the number of pole pairs, $I_d = I_s \cos \gamma$, $I_q = I_s \sin \gamma$, and $\gamma$ is the phase advance, which is defined as the offset angle between the stator reference frame and rotor position, and $\lambda_q$ is the q-axis flux linkage and $\lambda_d$ is the d-axis flux linkage. The phase advance has substantial influence on the torque production capability of the PMa-SynRM, as it depends on the d and q axis currents. To observe the $\gamma$ contribution on torque, which has been optimized using the FEA simulation under different operating conditions, the vector diagram is shown in FIG. 2.

3. Fault Current Calculation of PMa-SynRM

Figures 3A, 3B, 3C:
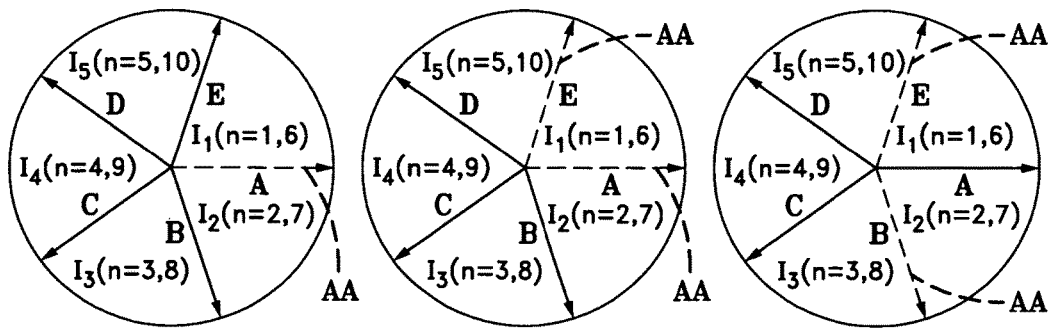
FIG. 3A is a circle diagram of the five-phase PMa-SynRM motor under a single phase fault.
FIG. 3B is a circle diagram of the five-phase PMa-SynRM motor under a two-phase adjacent fault.
FIG. 3C is a circle diagram of the five-phase PMa-SynRM motor under a two-phase non-adjacent fault.

As shown in FIGS. 3A-C, three types of phase faults of the PMa-SynRM motor are presented, which include a single-phase fault (A=0) (FIG. 3A), a two-phase adjacent fault (A, E=0) (FIG. 3B), and a two-phase non-adjacent fault (B,E=0) (FIG. 3C). These faulty phases are identified as a line designated "AA", while the remaining healthy phases are shown as black lines. In the event of a fault condition, the healthy phases need to be adjusted to optimize the torque requirement using the control system of the present invention to be discussed.

A. Open Phase Fault-Phase Current Calculations Used to Maintain the Same MMF (Magnetomotive Force) Under a Fault Condition By assuming the sinusoidal currents in each of the phases, and the sinusoidal winding functions, the MMF function can be calculated, as shown in Table 1 below.

TABLE 1

MMF (magnetomotive force) calculation.

| Phase Current | Winding Function | MMF |
|---|---|---|
| $I_1 = I_m \cos \theta = I_m \cos \alpha 1$ | $n_1 = (N_s/2) \cos \phi$ | $MMF_1 = I_1 \times n_1$ |
| $I_2 = I_m \cos(\theta - 2\pi/5) = I_m \cos \alpha 2$ | $n_2 = (N_s/2) \cos(\phi - 2\pi/5)$ | $MMF_2 = I_2 \times n_2$ |
| $I_3 = I_m \cos(\theta - 4\pi/5) = I_m \cos \alpha 3$ | $n_3 = (N_s/2) \cos(\phi - 4\pi/5)$ | $MMF_3 = I_3 \times n_3$ |
| $I_4 = I_m \cos(\theta - 6\pi/5) = I_m \cos \alpha 4$ | $n_4 = (N_s/2) \cos(\phi - 6\pi/5)$ | $MMF_4 = I_4 \times n_4$ |
| $I_5 = I_m \cos(\theta - 8\pi/5) = I_m \cos \alpha 5$ | $n_5 = (N_s/2) \cos(\phi - 8\pi/5)$ | $MMF_5 = I_5 \times n_5$ |

Thus, as shown in Table I, $I_1$ is the I-th phase current, $n_1$ is the I-th winding function, $MMF_1$ is the I-th MMF, $I_m$ is the amplitude of a phase current, and I is the integer (1 to 5). In particular, the total MMF can be derived as follows:

$MMF_1 = MMF_1 + MMF_2 + MMF_3 + MMF_4 + MMF_5 = 5/4 I_m \; N_s \cos(\theta - \phi)$.

By assuming the sinusoidal currents in each of the phases and the sinusoidal winding functions, current equations have been generalized for a single phase fault (Eq. 4), a two-phase fault (adjacent) (Eq. 5) and a two-phase fault (non-adjacent) (Eq. 6), as shown in Table 2 below.

TABLE 2

Generalized phase currents used to maintain the same MMF
(n is an integer 1, 2, 3 ... ).

| Single-Phase Fault (Eq. 4) | Two-Phase Fault (adjacent) (Eq. 5) | Two-phase fault (non-adjacent) (Eq. 6) |
|---|---|---|
| $I'_{(n+1)} = -I_{(n+3)} \times 1.38$ | | |
| $I'_{(n+2)} = I_{(n+2)} \times 1.38$ | $I'_{(n+2)} = 2.3 \times I_m \cos(\alpha_{n+2} + 2\pi/5)$ | $I'_{(n+1)} = 1.4 \times I_{n+1}$ |
| $I'_{(n+3)} = I_{(n+3)} \times 1.38$ | $I'_{(n+3)} = 3.67 \times I_{n+3}$ | $I'_{(n+3)} = 2.2 \times I_m \cos(\alpha_{n+3} + \pi/5)$ |
| $I'_{(n+4)} = -I_{(n+2)} \times 1.38$ | $I'_{(n+4)} = 2.3 \times I_m \cos(\alpha_{n+4} - 2\pi/5)$ | $I'_{(n+4)} = 2.2 \times I_m \cos(\alpha_{n+4} - \pi/5)$ |

Figure 4:
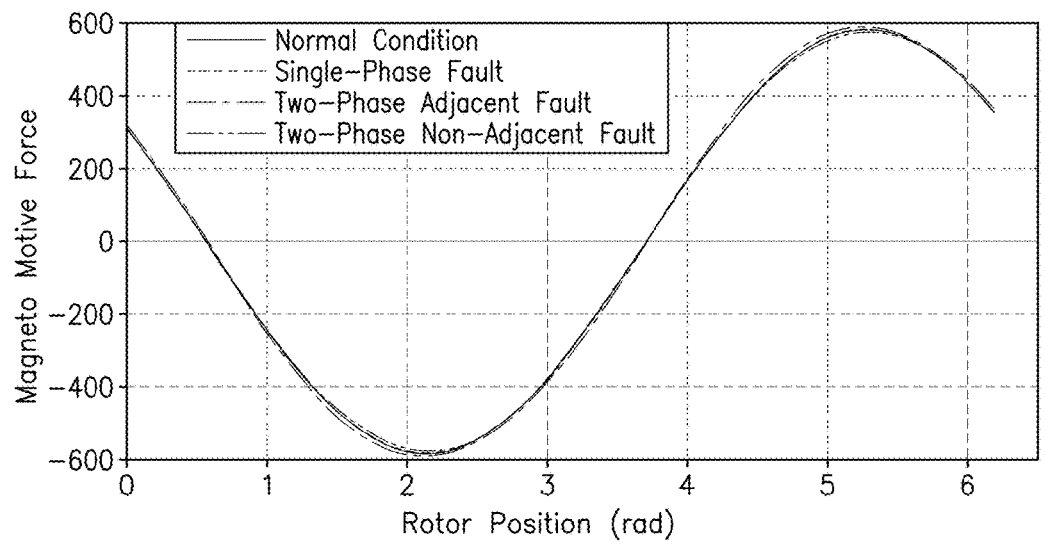
FIG. 4 is a graph showing the magnetomotive force (MMF) distribution of the PMa-SynRM motor under; normal conditions, a single-phase fault condition, a two-phase adjacent fault condition, and a two-phase non-adjacent fault condition.

FIG. 4 shows the same MMF function under different fault conditions. Assumptions taken in the derivation of Table 2 are as follows: 1) maintaining the same MMF; 2) symmetry of the currents; and 3) the zero sequence currents are zero. In Eq. 4, Eq. 5 and Eq. 6, n is a positive integer that represents the phase number. It assumes n=1 as phase 1, n=2 as phase two and so on. After reaching n=5, it starts to count again circularly as n=6 as one phase, and n=7 as phase 2, and so on. Thus, Equations 4-6 provided in Table 2 show that the magnitude of each phase current has increased upward to about 220% under the non-adjacent fault conditions and to about 230%-370% under the adjacent phase fault condition. This demonstrates the fault tolerant control strategy by maintaining the same MMF is not a viable solution, as it requires an extremely large current. Practically, due to the current rating limit of an electric motor/machine, and its inverter system, more than 150% of the rated current cannot be continuously supplied to the motor in most of the applications, and as such, which will not permit sustainable fault tolerant control when such current ratings are exceeded.

B. Phase Current Optimization with Current Constraint

To carry out sustainable fault operation of the motor, the following assumptions were made as follows: 1) zero sequence of the currents is zero; 2) the amplitude of the current remains within a sustainable range (150% of the rated value is assumed in the discussion herein); and 3) the maximum torque is maintained during the fault tolerant control of the motor.

TABLE 3

Proposed Current Equations

| Single-Phase Fault (Eq. 7) | Two-Phase Fault (adjacent) (Eq. 8) | Two-Phase Fault (non-adjacent) (Eq. 9) |
|---|---|---|
| $I_{12} = I_1 \cos(\theta - \phi_{12} + \gamma_1)$ | | |
| $I_{13} = I_1 \cos(\theta - \phi_{13} + \gamma_1)$ | $I_{22} = I_2 \cos(\theta - \phi_{22} + \gamma_2)$ | $I_{22} = I_2 \cos(\theta - \phi_{21} + \gamma_2)$ |
| $I_{14} = I_1 \cos(\theta - \phi_{14} + \gamma_1)$ | $I_{23} = I_2 \cos(\theta - \phi_{13} + \gamma_2)$ | $I_{22} = I_2 \cos(\theta - \phi_{23} + \gamma_2)$ |
| $I_{15} = I_1 \cos(\theta - \phi_{15} + \gamma_1)$ | $I_{24} = I_2 \cos(\theta - \phi_{24} + \gamma_2)$ | $I_{22} = I_2 \cos(\theta - \phi_{24} + \gamma_2)$ |

The proposed new set of currents is shown in Table 3, whereby Eq. 7 is for a single-phase fault; Eq. 8 is for a two-phase adjacent fault; and Eq. 9 is for a two-phase non-adjacent fault. In particular, $I_n$ is the fault current amplitude, $\phi_{nm}$ is the phase angle of the currents, $\gamma_{nm}$ is the phase advance of the currents, n=1 or 2 based on single-phase fault or two-phase faults, and m is the number of phases.

Thus, the phase advance has been considered as being constant. Based on the assumptions discussed above, the amplitudes and phase angle of the phase currents have been optimized by utilizing an optimization technique or process 100 shown in FIG. 5.

Figure 5:
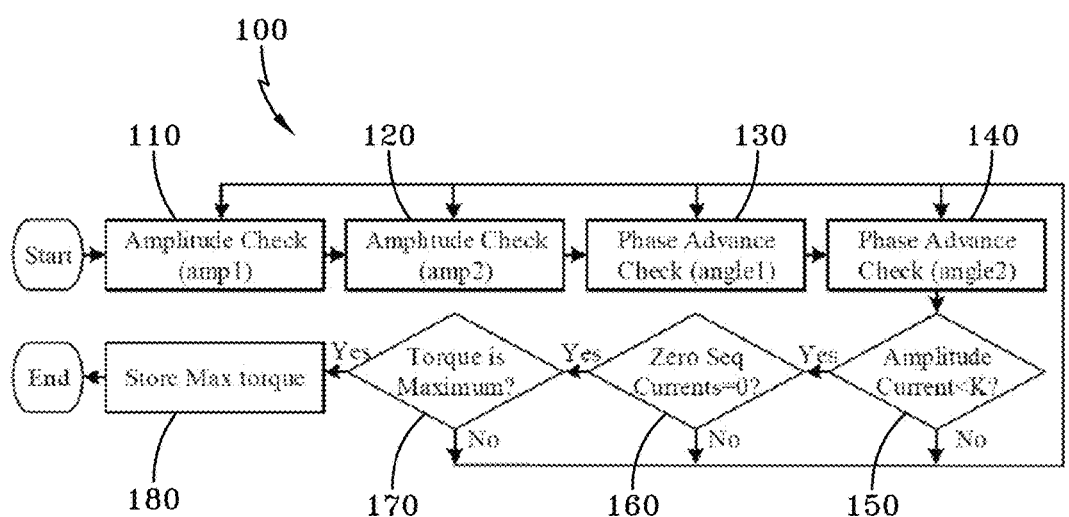
FIG. 5 is a block-diagram showing an optimization process that is used for controlling a multi-phase permanent magnet assisted synchronous reluctance motor (PMa-SynRM), which is utilized by a fault tolerant control system that is provided in accordance with the concepts of the present invention.

In particular, the optimization process shown in FIG. 5 may be carried out using any suitable computing system and/or software. Initially, at steps 110, 120, 130 and 140 an amplitude check (amp1), an amplitude check (amp2), a phase advance check (angle1) and a phase advance check (angle2) is performed sequentially. After the completion of the phase advance check at step 140, the process generates an output that is fed to step 150, which determines whether the amplitude of the current is less than value K. If the amplitude current at step 150 is less than value K, then the process continues to step 160 where the process determines whether the zero sequence currents are equal to zero or not. If the zero sequence currents are equal to zero at step 160, the process continues to step 170 where the process determines whether the motor torque is at its maximum or not. If the motor torque is identified as being a maximum value, the process 100 continues to step 180, where the maximum torque value is stored. However, if at step 150 the amplitude current is not less than value K, or if at step 160 the zero sequence currents are not equal to zero, or at step 170, the torque of the motor is not determined to be at its maximum, the process returns back to step 110, 120, 130, and 140 in a parallel manner. Accordingly, the process 100 is repeated until a desirable maximum motor torque value is identified and stored.

With reference to FIG. 5, the motor/machine parameters have been chosen from the finite element analysis (FEA) model parameter set. Since the single-phase fault is already within the current limit, which is 150%, it is not considered in the optimization. For a two-phase fault, one phase was assumed as fixed, and the other two phases are optimized. For example, for a two-phase adjacent fault (assuming A, E=0), the phase current of phase-c is kept fixed, whereas the parameters of phase-b (phase current amplitude1, angle1) and phase-d (phase current amplitude2, phase angle2) are tuned to find the maximum torque. For a two-phase non-adjacent fault (assuming B,E=0), the current of phase-a is kept fixed, whereas the parameters of phase-c (phase current amplitude1, phase current angle1) and phase-d (phase current amplitude2, phase current angle2) are changed to find maximum torque. The optimal phase current angles and phase current amplitudes of each of the cases are provided in Table 4 below.

TABLE 4

Phase parameters from MATLAB simulation.

| Phase Parameter | Single-Phase Fault | Two-Phase (adjacent fault) | Two-Phase (non-adjacent fault) |
|---|---|---|---|
| Amplitude1 | 1.4 * $I_{rated}$ | 1.4 * $I_{rated}$ | 1.4 * $I_{rated}$ |
| Phase Angle1 | 36 degree (lag) | 7 degree (lag) | 96 degree (lag) |
| Amplitude2 | 1.4 * $I_{rated}$ | 1.5 * $I_{rated}$ | 1.3 * $I_{rated}$ |
| Phase Angle2 | 324 degree (lag) | 116 degree (lag) | 286 degree (lag) |

As shown in Table 4, all phase currents remained below 150% of the rated current of the motor, which confirms that the assumptions are satisfied in the optimization. The torque production of the motor/machine with the derived current will be presented in detail below. By utilizing the optimized results shown in table 4, the transformation matrix in Eq. (2) can be clearly defined, which can be utilized for deriving the direct axis and quadrature axis components under different conditions. By considering those phase angles of the currents, the parameters defined in Eq. (2) can be found as follows, whereby under a single-phase fault condition (assuming a Phase A fault), A=0 and $P_b=P_e=1$; and under two-phase fault conditions (assuming phase B and E non-adjacent), B=E=0, and $P_c=P_d=1$.

C. Phase Current Optimization Considering Saturation

One of the critical parameters of PMa-SynRM is gamma, γ, in which its optimization leads to the full utilization of reluctance torque. Due to the uneven distribution of MMF resulting from faults and increased currents, an uneven operation of the motor/machine will result. Therefore, there is significant and unpredictable change of gamma, γ, as compared to the one in a healthy motor/machine without faults, which should be tuned for optimal and sustainable fault tolerant control. The total current is considered as $I_F \angle \gamma_F$, where the γ is the phase advance. Using the torque equation Eq. (3), it can be maximized by differentiating $dT_e/d\gamma=0$ and solving for γ using the following equations:

$$T_e = \frac{5}{2}\frac{P}{2}[\lambda_{PM}I_s\cos\gamma + (L_d - L_q)I_s\cos\gamma I_s\sin\gamma] \quad \text{Eq. (10)}$$

$$\gamma = \sin^{-1}\frac{-\lambda_{PM} + \sqrt{\lambda_{PM}^2 + 8(L_d - L_q)^2 I_s^2}}{4(L_d - L_q)I_s}. \quad \text{Eq. (11)}$$

Under fault conditions, Eq. (10) and (11) can be roughly modified as follows:

$$T_e = \frac{5}{2}\frac{P}{2}[\lambda_{PM}I_F\cos\gamma_F + (L_{dF} - L_{qF})I_F\cos\gamma_F I_F\sin\gamma_F] \quad \text{Eq. (12)}$$

$$\gamma_F = \sin^{-1}\frac{-\lambda_{PM} + \sqrt{\lambda_{PM}^2 + 8(L_{dF} - L_{qF})^2 I_F^2}}{4(L_{dF} - L_{qF})I_F}, \quad \text{Eq. (13)}$$

where, $I_F$ is the fault current magnitude under fault condition, $\gamma_F$ is the phase advance under a fault condition, $L_{dF}$ and $L_{qF}$ is the d and q axis inductance under fault conditions. The d-axis and the q-axis inductances under different fault conditions can be estimated using the inductance matrix shown in FIG. 14.

In particular in FIG. 14, L is the inductance, and a, b, c, d and e are the phases of the motor. The inductance matrix shows the self-inductances as well as mutual inductances in different phases. The matrix takes a modified number of rows (R) and columns (C) based on the number of phase faults. For example, for single-phase faults (phase-a), the R-1 and C-1 is zero. Therefore, the dimension of the matrix becomes 4×4. For two-phase adjacent faults, (phase-a and phase-e) R-1, R-5 and C-1, C-5 becomes zero. Therefore, the dimension of the matrix becomes 3×3. For two-phase non-adjacent faults (phase-b and phase-e) R-2, R-5 and C-2 and C-5 become zero. The value of the elements of the inductance matrix can be experimentally found. Utilizing those values, the d-axis and q-axis inductances can be found by using Eq. (2). Under normal rated conditions using the machine parameters, the phase advance has been calculated as about 228 degrees.

Simulation and Experimental Results

Below, the simulation and experimental results are presented, whereby the FEA model (PMa-SynRM), which has been used for the simulation, takes the operating specifications as shown in Table 6 below.

TABLE 6

Specifications of the multi-phase PMa-SynRM motor

| Phases | Slots | Poles | Rated Power | Rated Speed | Rated Current | Rated Torque | Rated Voltage |
|---|---|---|---|---|---|---|---|
| 5 | 15 | 4 | 3 kW | 1800 RPM | 15.2 Amps | 15 Nm | 67 |

Figure 6A:
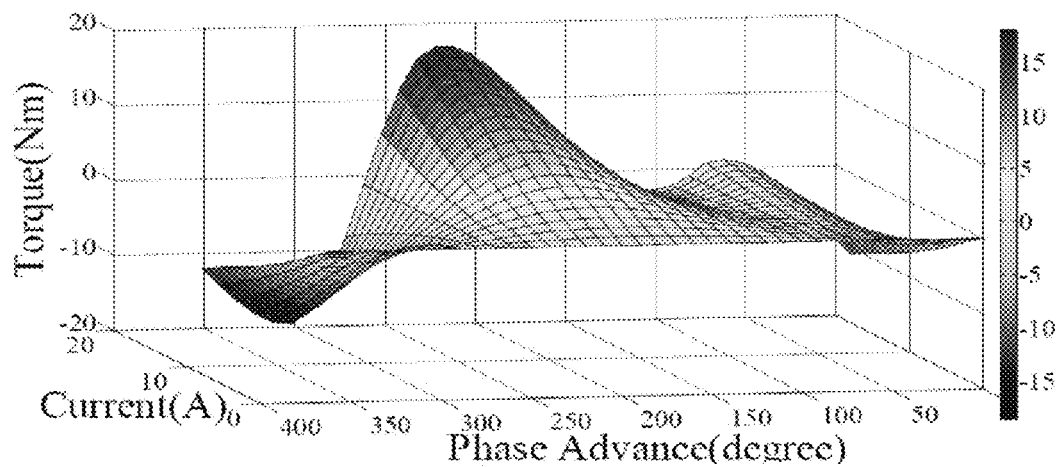
FIG. 6A is a graph showing the torque vs. phase advance of a multi-phase permanent magnet assisted synchronous reluctance motor (PMa-SynRM) under normal conditions.
Figure 6B:
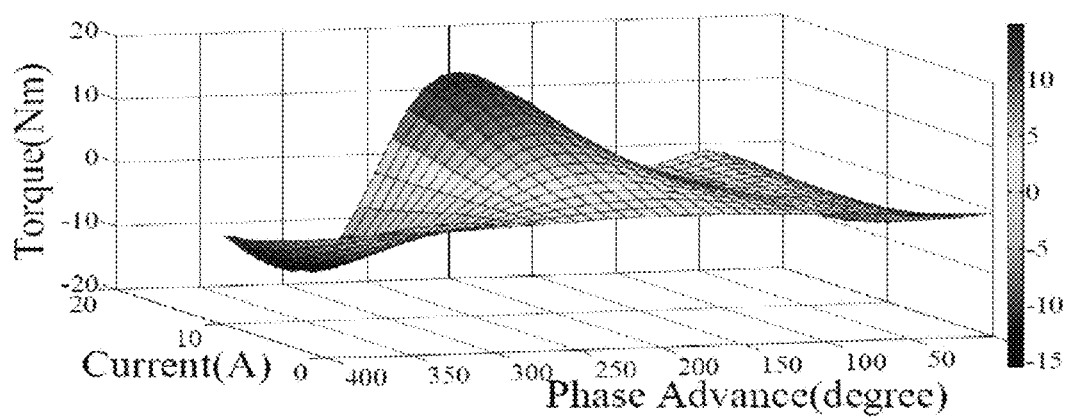
FIG. 6B is a graph showing the torque vs. phase advance of a multi-phase permanent magnet assisted synchronous reluctance motor (PMa-SynRM) under a single-phase fault condition.
Figure 6C:
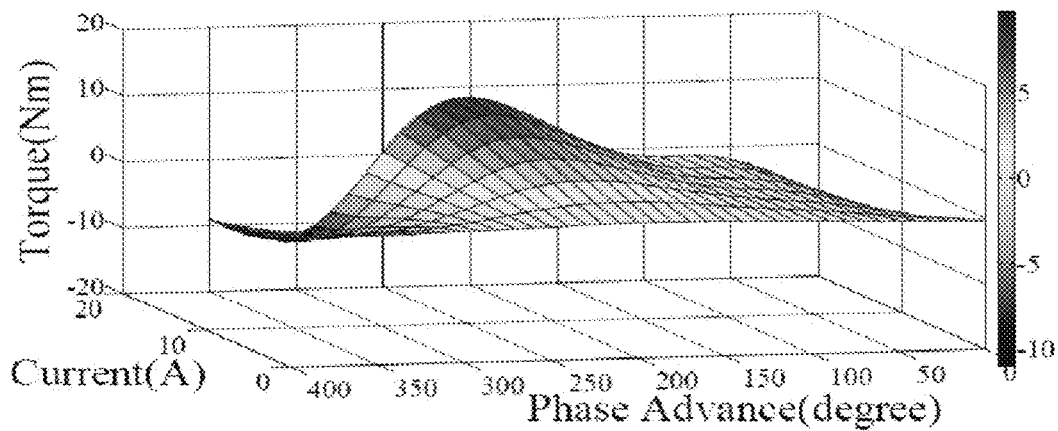
FIG. 6C is a graph showing the torque vs. phase advance of a multi-phase permanent magnet assisted synchronous reluctance motor (PMa-SynRM) under a two-phase non-adjacent fault condition.
Figure 6D:
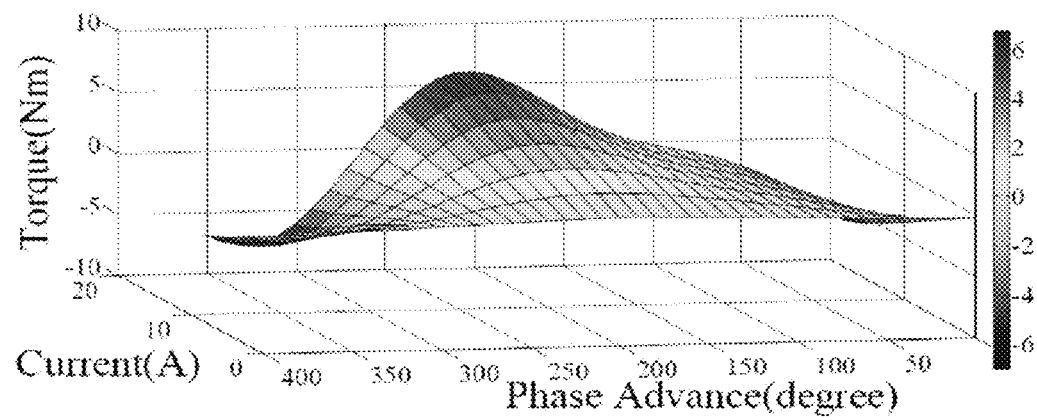
FIG. 6D is a graph showing the torque vs. phase advance of a multi-phase permanent magnet assisted synchronous reluctance motor (PMa-SynRM) under a two-phase adjacent fault condition.

The FEA simulation results are given utilizing phase advances. The phase advance has been calculated under normal conditions, as well as for different fault conditions. FIGS. 6A-D shows 3D (three-dimensional) plots of the torque variation in accordance with the phase advances and phase currents for normal operation of the motor. Under normal conditions, the maximum torque of about 15 Nm is found at a phase advance of about 230 degrees, as shown in FIG. 6(A). The results for a single-phase fault, a two-phase adjacent fault, and a two-phase non-adjacent fault of the PMa-SynRM is shown respectively in FIG. 6(B), FIG. 6(C) and FIG. 6(D). The phase advances found for respective faults are about 220°, 215° and 210°, where the maximum torque is calculated as approximately 14.14 Nm, 8.8 Nm and 6 Nm.

It is observed that in the worst case scenario ~44% of the rated torque of the PMa-SynRM can be achieved for a two-phase fault, whereas ~94% of the rated torque can be achieved for a single-phase fault, which is largely improved, as compared to other prior art motor strategies and techniques used to control PMa-SynRMs.

Figure 7:
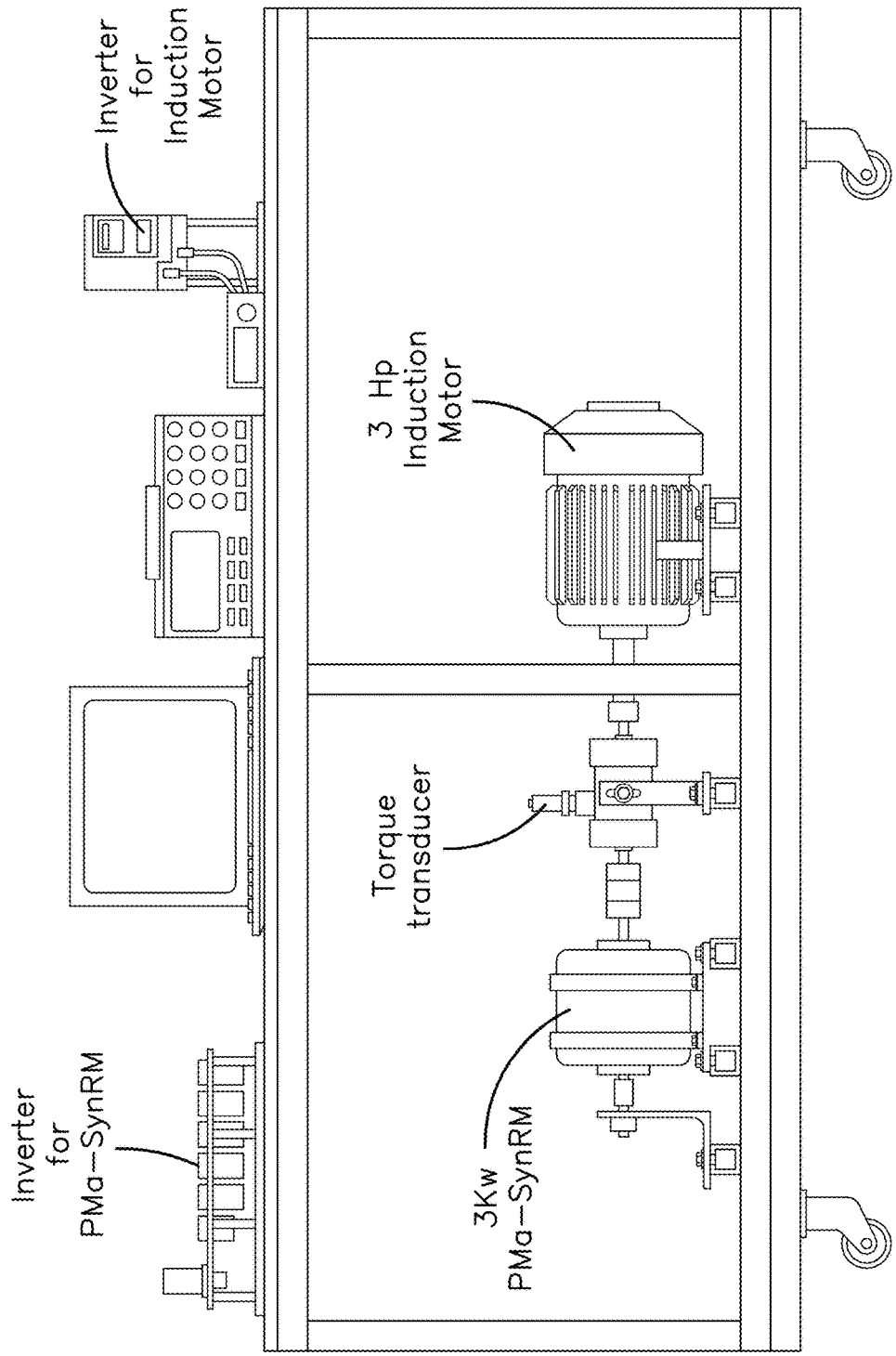
FIG. 7 shows a test setup used for evaluating the fault tolerant control system of the present invention.

The motor/machine specifications, which are shown in Table 6, has been adopted for the system environment to test the proposed method. A block diagram of the proposed control scheme is shown in FIG. 7. The principle of the vector control is being used to control the torque of the five-phase machine. The fault tolerant algorithm shown in FIG. 8, which manipulates the fault current magnitude and the phase advance, may be implemented in a Texas Instruments DSP (digital signal processor) having model number F28335, which uses low memory and less computation complexity. However, it should be appreciated that any suitable DSP processor may be used.

Figure 8:
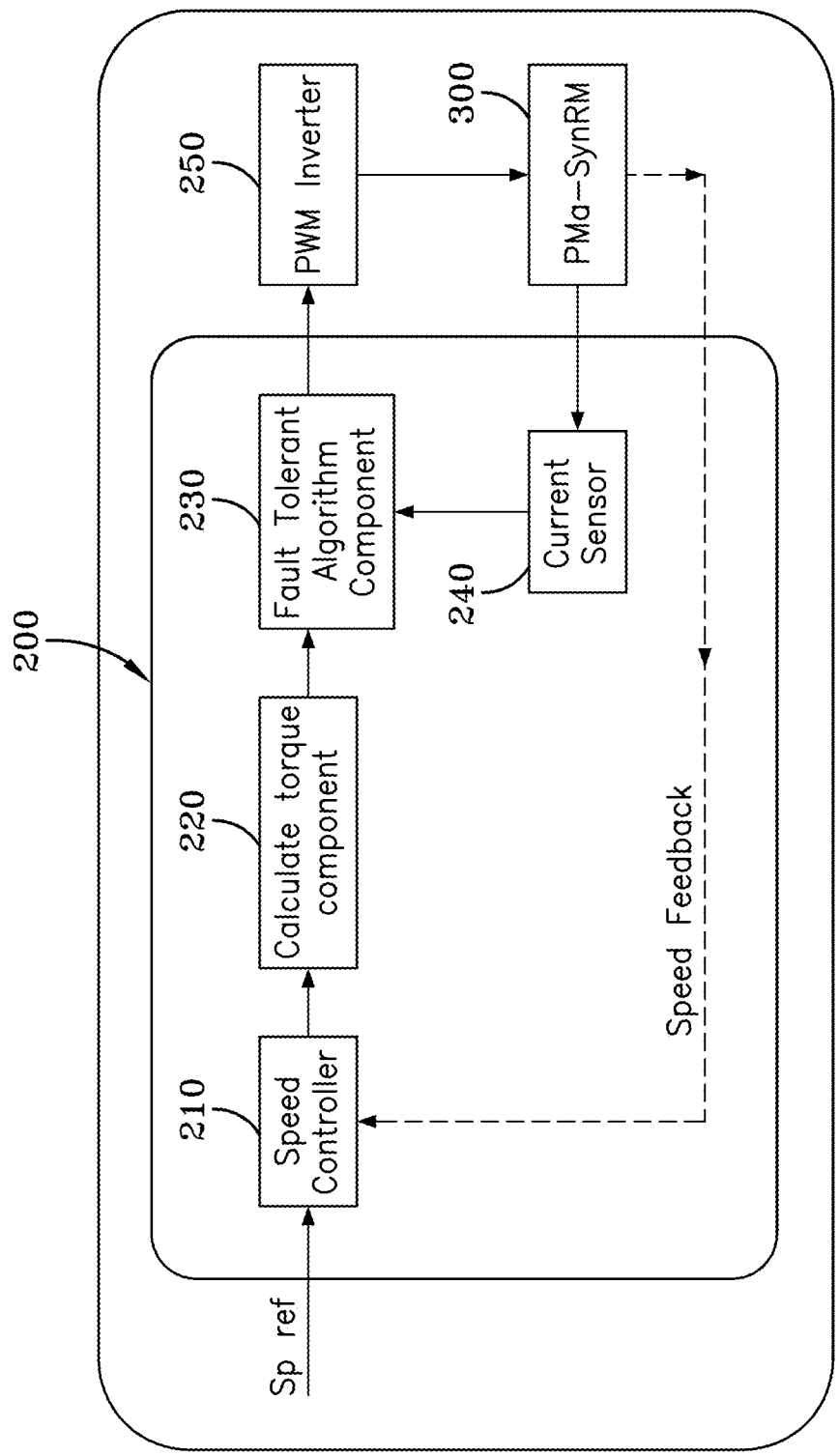
FIG. 8 is a block-diagram of a field-oriented control system of the present invention for a five-phase PMa-SynRM motor, which utilizes a fault tolerant algorithm provided by the control system of the present invention for controlling the multi-phase permanent magnet assisted synchronous reluctance motor (PMa-SynRM) in accordance with the concepts of the present invention.

A 5 HP dynamo is designed to test the proposed fault tolerant system shown in FIG. 7. The principle of the vector control that is being used by the present invention to control the speed of the five-phase motor/machine is shown in FIG. 8. The fault tolerant algorithm, which manipulates the current magnitude and the phase advance, may be implemented using a Texas Instruments DSP (digital signal processor) having model number F28335, however any suitable processing device may be used. As such, a control system 200 used by the present invention to provide vector control of the PMa-SynRM is provided in FIG. 8. Specifically, the control system 200 includes a speed controller unit 210 that is coupled to a calculate torque component 220. It should be appreciated that the speed controller 210 receives a speed reference signal (SP ref) that sets the desired speed of the motor 300. The output of the calculated torque component 220 is coupled to a fault tolerant algorithm component 230.

In addition, the control system 200 includes a current sensor 240 that has an output that is coupled to the fault tolerant algorithm component 230. Thus, to place the motor control 200 into operation, the fault tolerant algorithm component 230 is coupled to a PWM (pulse width modulation) inverter component 250 that is provided by a PMa-SynRM motor 300 that is being controlled. As shown in FIG. 8, the PWM inverter 250 generates a control signal that is applied to the motor 300 to control its operation based on the input from component 230. In addition, the current sensor 240 of the control system 200 receives an output signal from the motor 300 indicating the amount of electrical current that is being consumed by the motor 300, which is fed back to the fault tolerance algorithm component 230. Furthermore, a speed signal that is generated by the motor 300 is output therefrom and supplied to the speed controller 210. As such, the fault tolerant algorithm component 230 operates as part of a vector control that receives a torque input from torque calculations component 220 and an electrical current feedback signal from the current sensor 240. Thus, the fault tolerant algorithm component 230 is configured to modify the control signals (i.e. optimized torque angle and optimized phase current signals) that are applied to or via the PWM inverter component 250 to the motor 300, in accordance with the concepts of the present invention that are discussed herein. It should be appreciated that the fault tolerant algorithm component 230, as well as the control system 200, or any portion thereof, may be implemented in hardware, software or a combination thereof. For example, the process preferred by the fault tolerance algorithm component 230 may be implemented by any suitable processor of computing device.

Figure 9A:
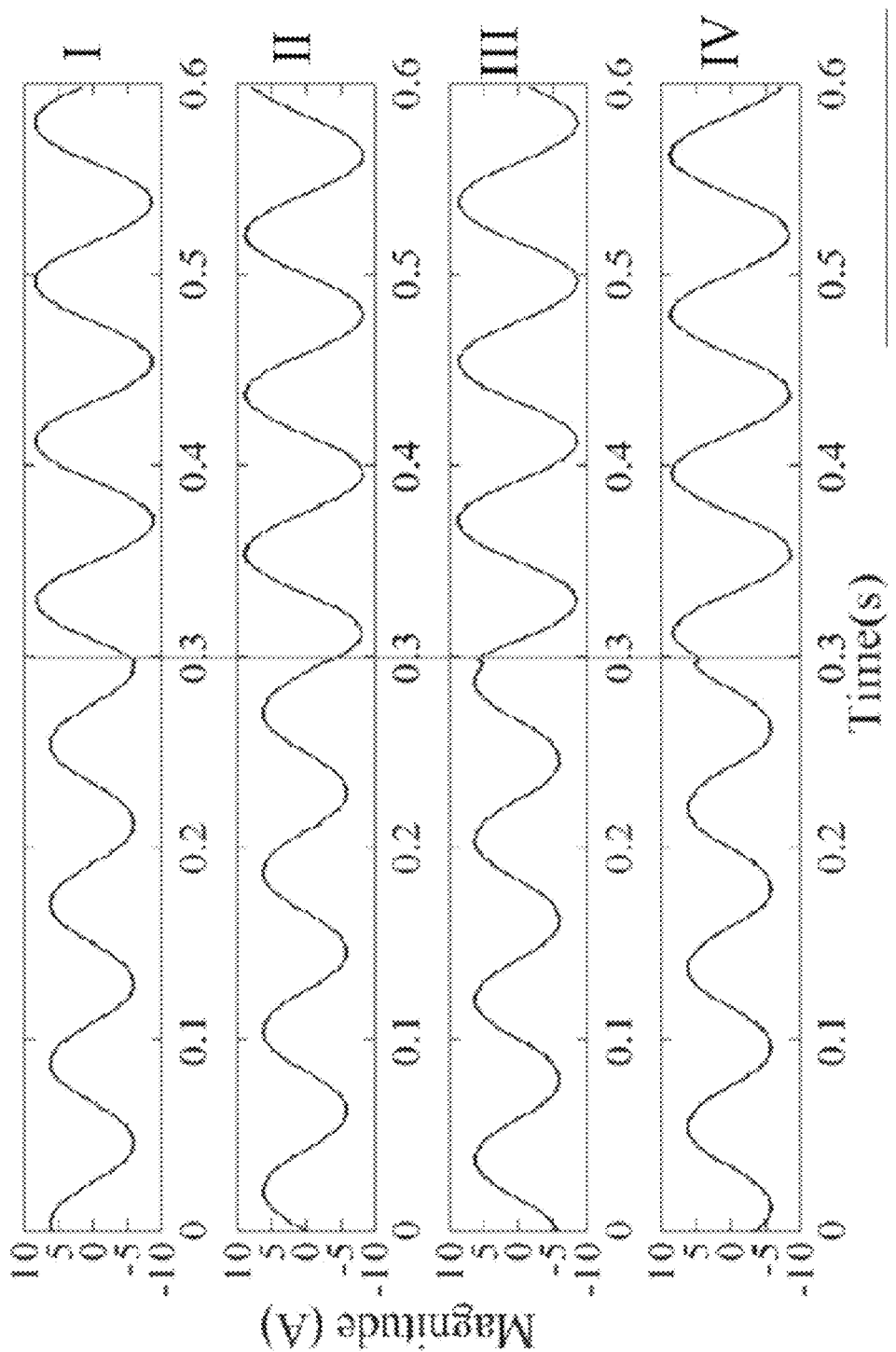
FIG. 9A are graphs showing the electrical currents of phase B (I), phase C (II), phase D (III), and phase E (IV) of the multi-phase (i.e. 5-phase) permanent magnet assisted synchronous reluctance motor (PMa-SynRM) that are applied by the fault tolerant control system of the present invention under a single-phase open fault in accordance with the concept of the present invention.
Figure 9B:
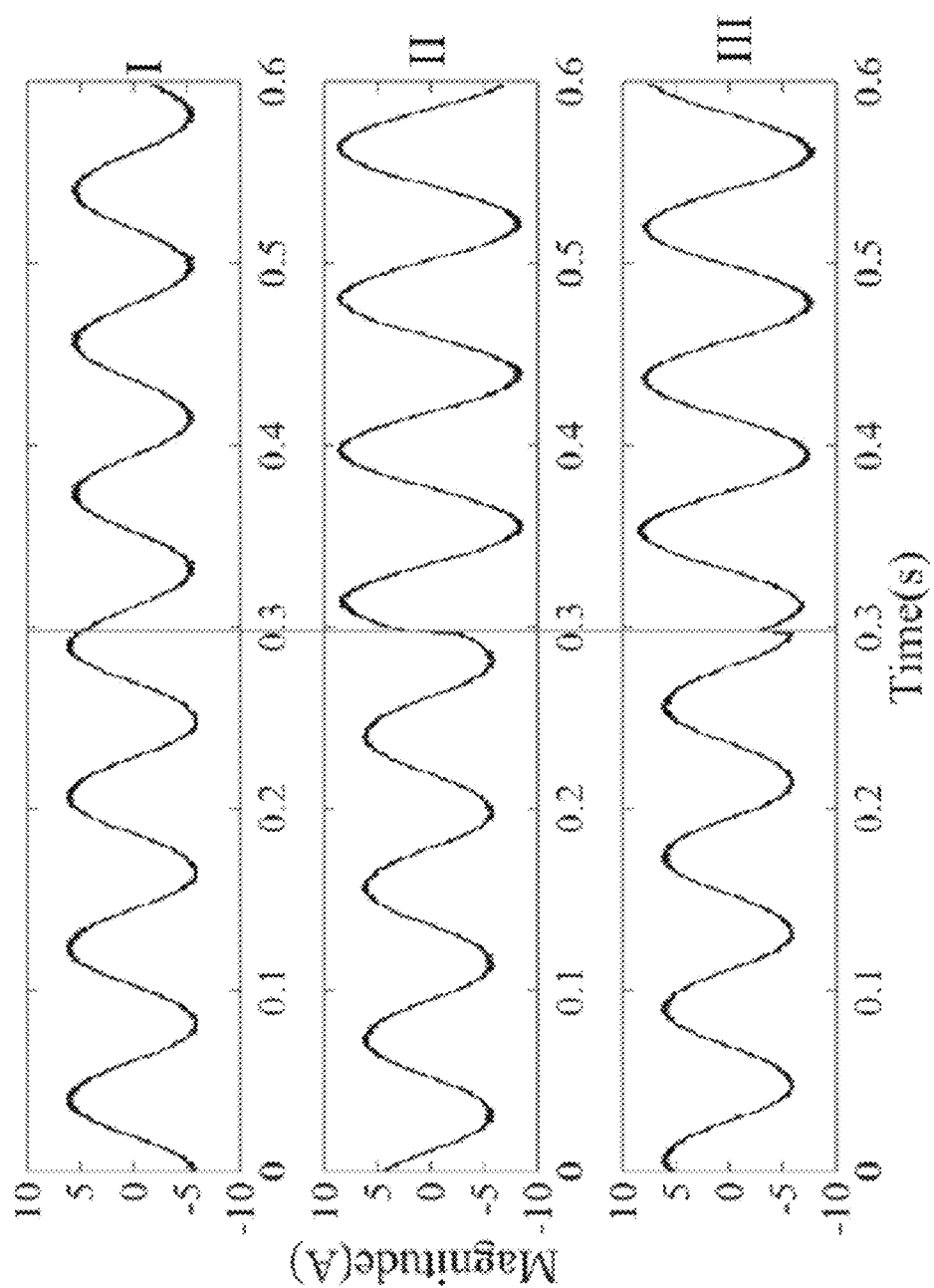
FIG. 9B are graphs showing the electrical currents of phase A (I), phase C (II), and phase D (III) of the multi-phase permanent magnet assisted synchronous reluctance motor (PMa-SynRM) that are applied by the fault tolerant control system of the present invention under a non-adjacent two-phase open fault in accordance with the concepts of the present invention.
Figure 9C:
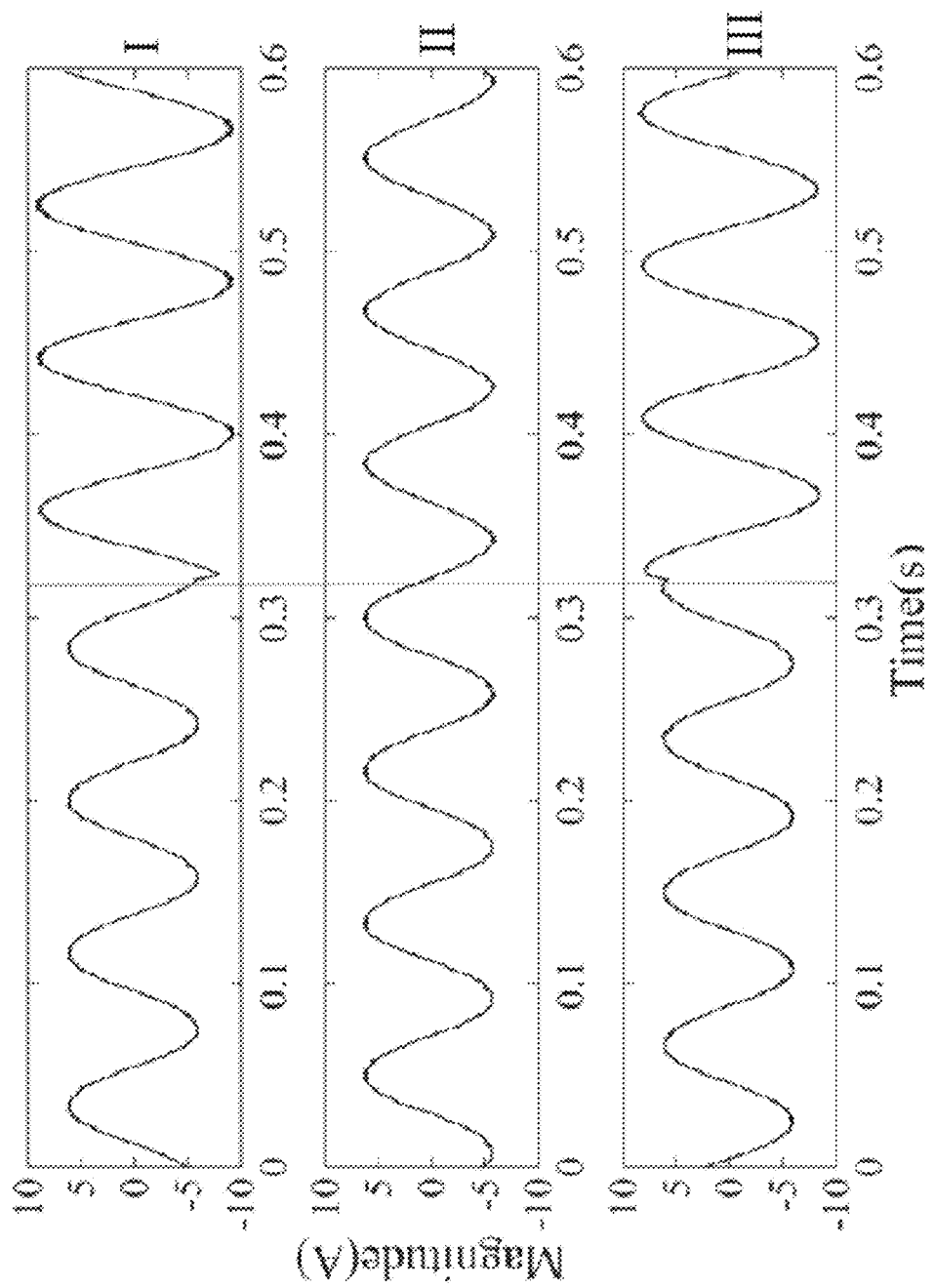
FIG. 9C are graphs showing the electrical currents of phase B (I), phase C (II) and phase D (III) of the multi-phase permanent magnet assisted synchronous reluctance motor (PMa-SynRM) that are applied by the fault tolerant control system of the present invention under an adjacent two-phase open fault in accordance with the concepts of the present invention.
Figure 10A:
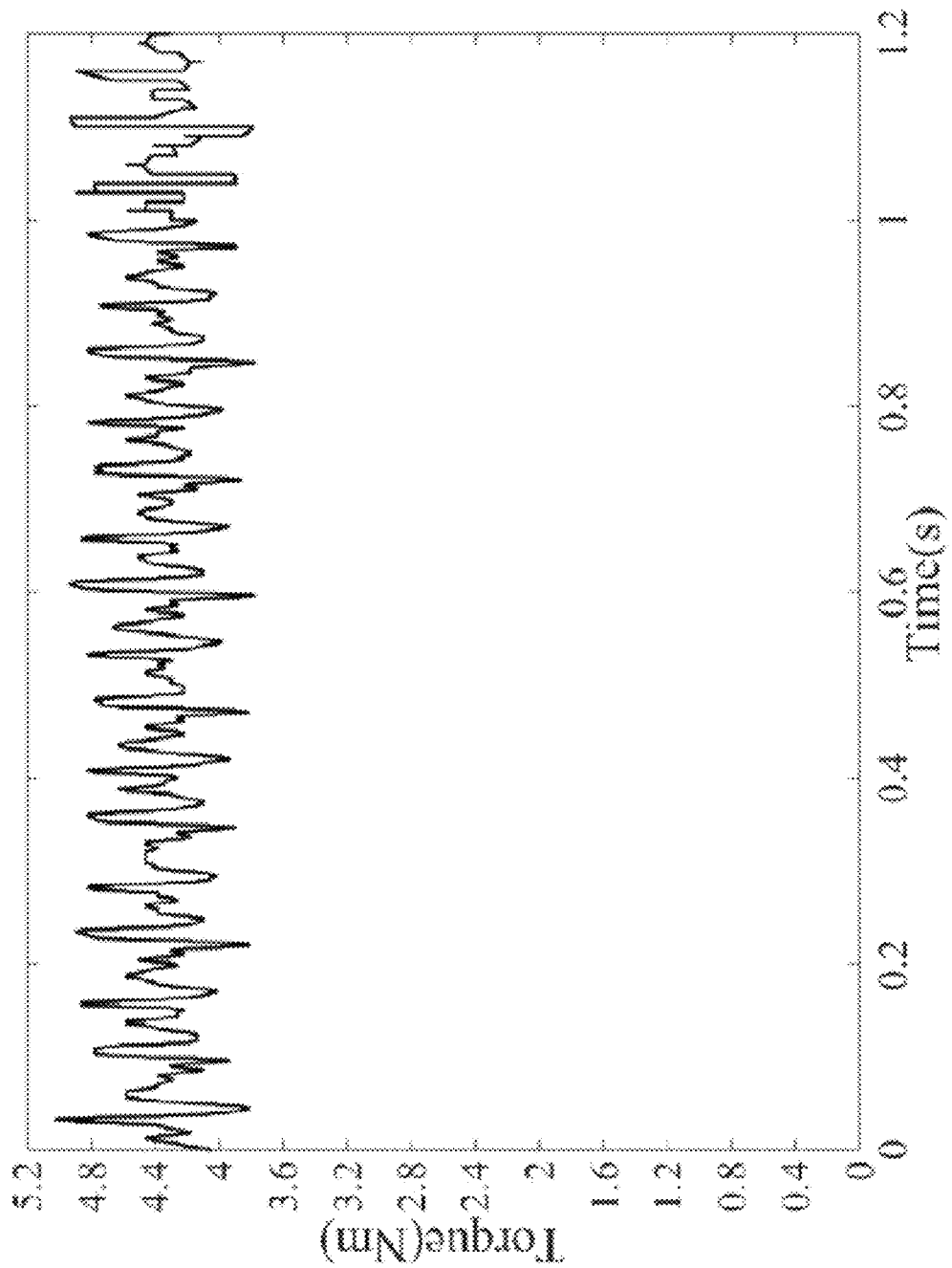
FIG. 10A is a graph showing the torque of the multi-phase permanent magnet assisted synchronous reluctance motor (PMa-SynRM) when the motor is under normal operation.
Figure 10B:
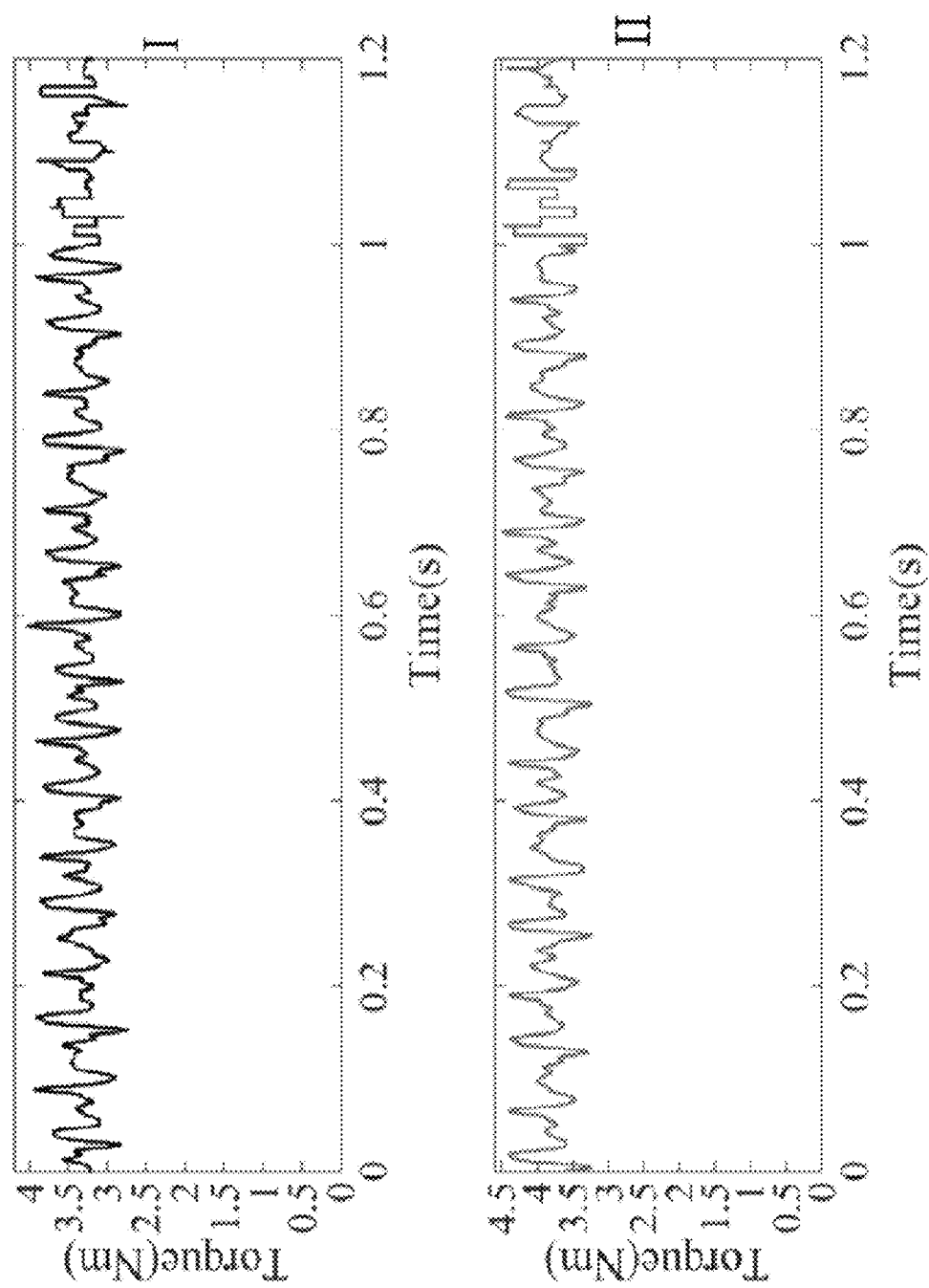
FIG. 10B is a graph showing the torque of the multi-phase permanent magnet assisted synchronous reluctance motor (PMa-SynRM) when the motor is under a single-phase fault, when under a pre-condition (I) and when under the control of the fault tolerant control system (II) of the present invention in accordance with the concepts of the present invention.
Figure 10C:
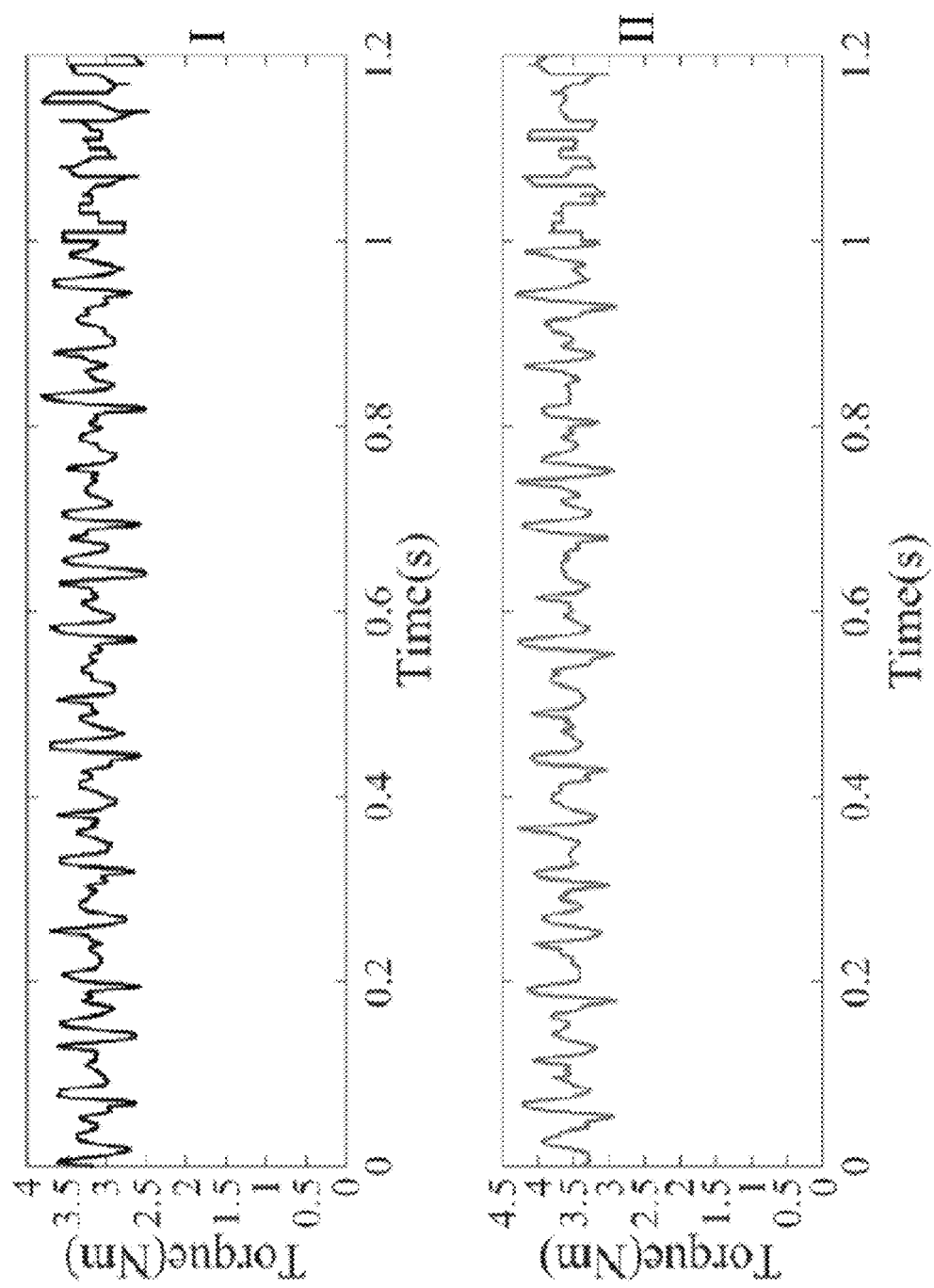
FIG. 10C is a graph showing the torque of the multi-phase permanent magnet assisted synchronous reluctance motor (PMa-SynRM) when the motor is under a two-phase non-adjacent fault, when under a pre-condition (I) and when under the control of the fault tolerant control system (II) of the present invention in accordance with the concepts of the present invention.
Figure 10D:
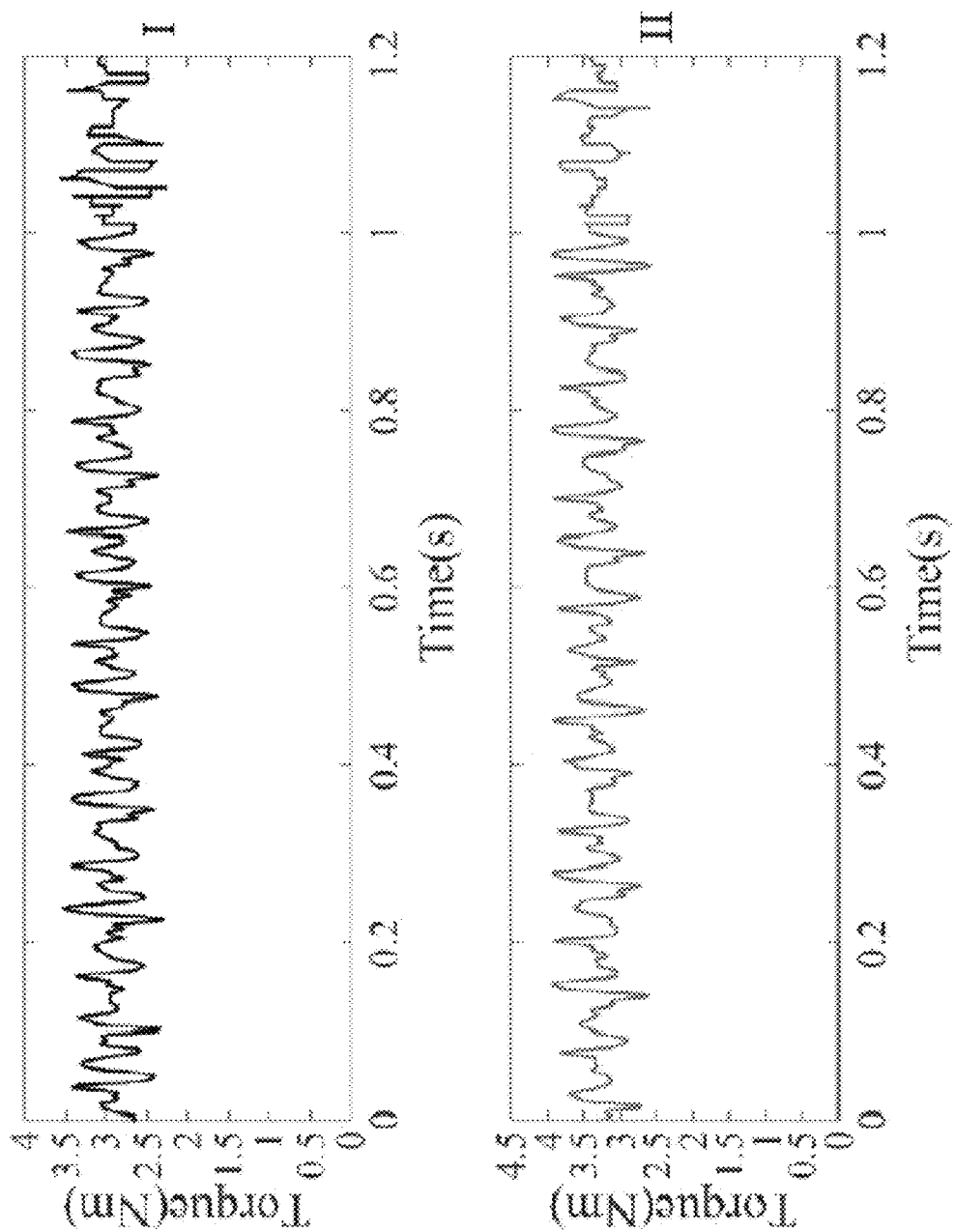
FIG. 10D is a graph showing the torque of the multi-phase permanent magnet assisted synchronous reluctance motor (PMa-SynRM) when the motor is under a two-phase adjacent fault, when under a pre-condition (I) and when under the control of the fault tolerant control system (II) of the present invention in accordance with the concepts of the present invention.
Figure 11:
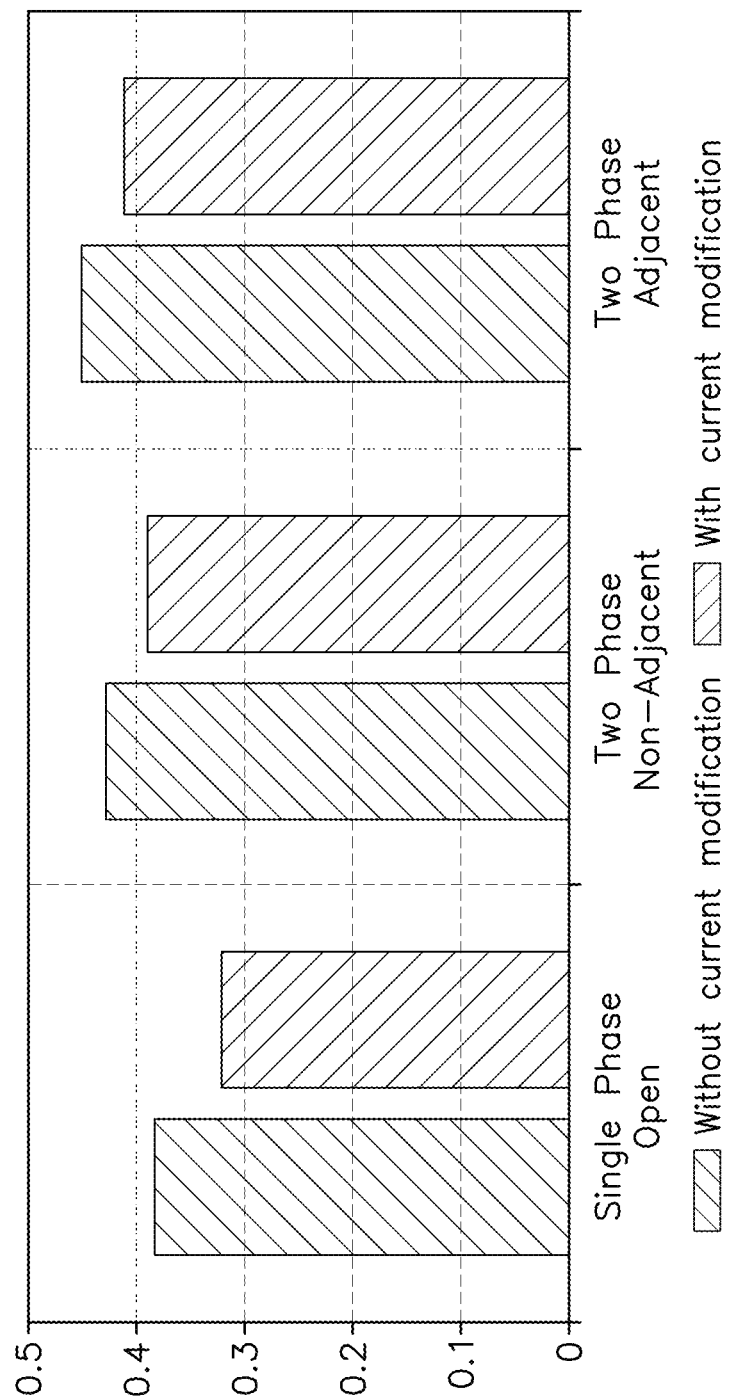
FIG. 11 is a graph showing a comparison of the amount of ripple of a multi-phase permanent magnet assisted synchronous reluctance motor (PMa-SynRM) that is subjected to a single-phase open fault; a two-phase non-adjacent fault; and a two-phase adjacent fault with and without the phase current modification that is provided by the fault tolerant control system of the present invention in accordance with the concepts of the present invention.
Figure 12:
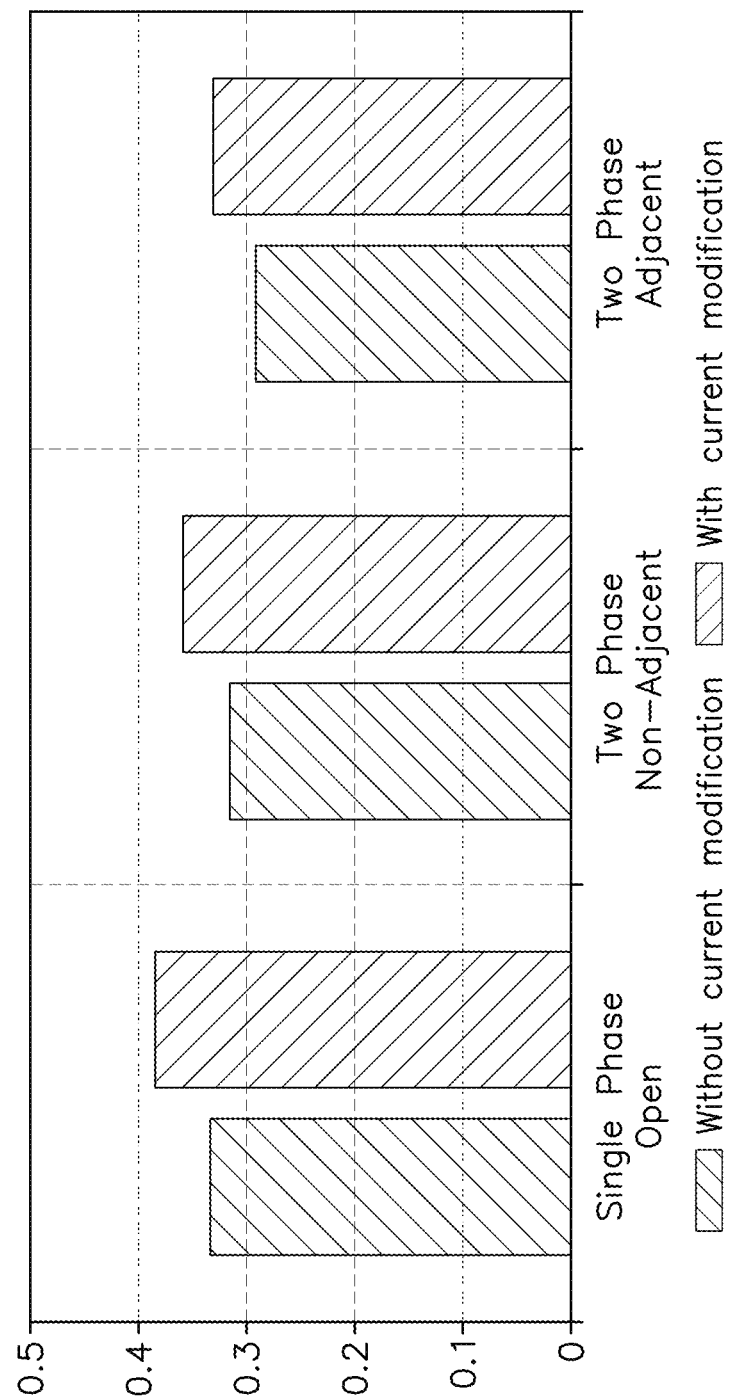
FIG. 12 is a graph showing a comparison of the average amount of torque of a multi-phase permanent magnet assisted synchronous reluctance motor (PMa-SynRM) that is subjected to a single-phase open fault; a two-phase non-adjacent fault; and a two-phase adjacent fault with and without current modification that is provided by the fault tolerant control system of the present invention in accordance with the concepts of the present invention.
Figure 13:
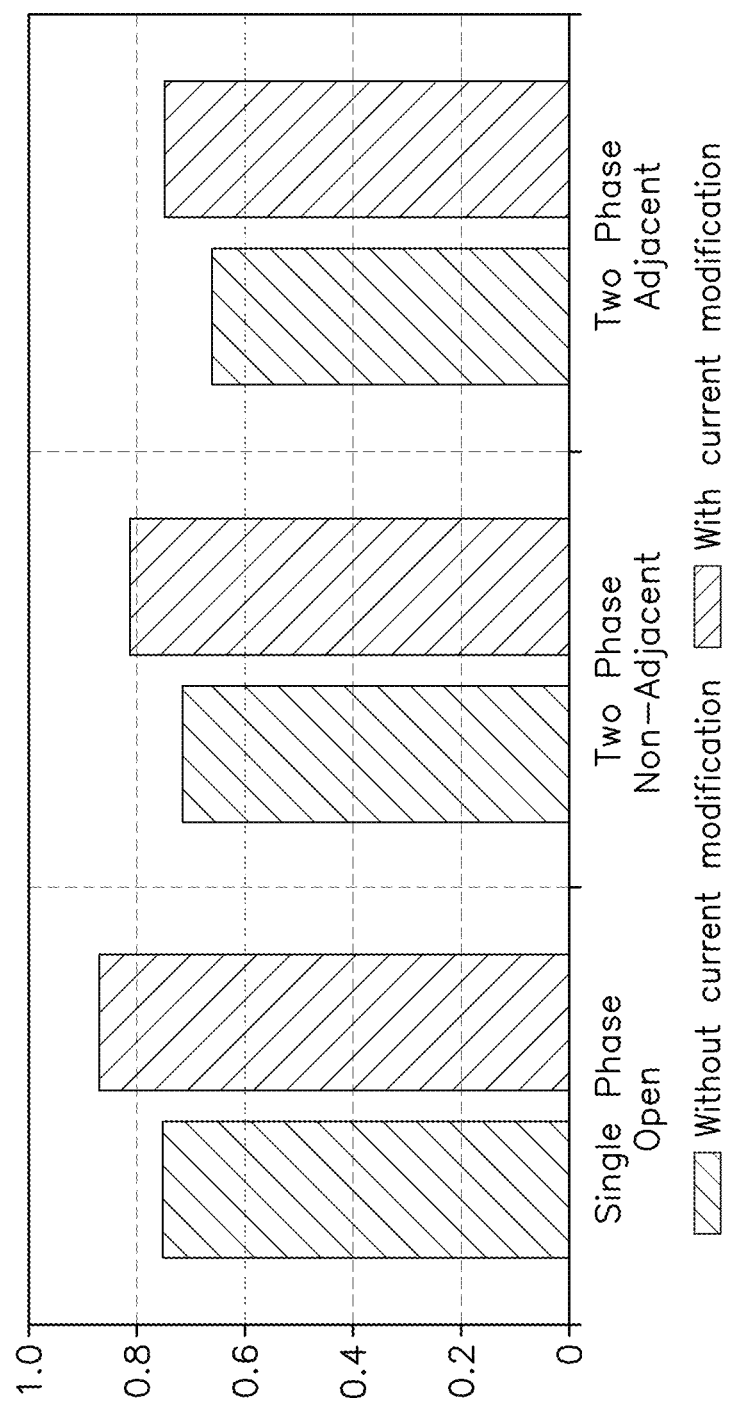
FIG. 13 is a graph showing a comparison of the normalized torque of a multi-phase permanent magnet assisted synchronous reluctance motor (PMa-SynRM) that is subjected to a single-phase open fault; a two-phase non-adjacent fault; and a two-phase adjacent fault with and without current modification provided by the fault tolerant control system of the present invention in accordance with the concepts of the present invention.

As such, the five-phase motor/machine has been successfully controlled through field-oriented control as contemplated herein. To make a comparison under different conditions, the motor/machine was run at low speed (360 RPM) under normal and fault conditions at 30% of the rated load. The applied currents at pre and post fault conditions, and at different fault situations are shown in FIGS. 9A-C. Specifically, at FIG. 9A, a single-phase fault is shown. A line has been drawn at a time when the single-phase open fault has occurred and the modified algorithm has been applied to the system. Similarly, the current shapes for two-phase, non-adjacent open faults and two-phase adjacent open faults have been shown in FIG. 9B and FIG. 9C. With the proposed scheme, the torque has been measured under different fault conditions, the results of which are shown in FIGS. 10A-D. The results match the theoretical analysis, where the average torque decreases with the severity of the fault that has occurred. FIG. 10A shows the torque under normal conditions. FIG. 10B shows the measured torque under a single-phase fault with and without the proposed scheme. Similarly, torque plots for a two-phase, non-adjacent and an adjacent open fault are shown in FIGS. 10C and 10D. A comparison analysis of the average torque, % of ripple and normalization torque has also been shown in FIGS. 11-13.

Thus, the present invention provides a fault tolerant control for a five phase PMa-SynRM. Multiple fault conditions have been analyzed to provide maximum and sustainable torque control. To achieve this, the amplitude of the electrical current has been reasonably limited and the current angle of the healthy phases have been optimized through MATLAB simulation, which is then fine tuned through a FEA to introduce the phase advance by considering the non-linear saturation of the machine under fault conditions. A comprehensive analysis has been performed for two cases of fault. It has been shown that the control method of the claimed invention provides a more sustainable and optimal fault tolerant control than those that existed with MMF based strategies or other known control systems.

As such, by identifying the detected open-phase faults in a permanent magnet assisted synchronous reluctance motor (PMa-SynRM), the fault tolerant control of the present invention is able to be performed to maintain a suitable amount of torque at the motor. That is, open phase faults in the PMa-SynRM may be detected using several known techniques and methods, which have been previously discussed. Once the open-phase fault is detected in the motor/machine, the detected faulty phases are required to be removed from the operation of the motor immediately for the sake of the other healthy phases in the PMa-SynRM motor. Once the healthy phases are removed from operation, the overall torque output of the motor is reduced, which may not be expected or desired in crucial loading conditions. Thus, to compensate for reduced overall torque of the motor, the remaining healthy phases of the PMa-SynRM motor are tuned to maximize their torque producing ability. This tuning process is performed using the control system of the present invention, which adjusts both the magnitude and/or angle of the phase currents that are applied to the remaining healthy phases of the PMa-SynRM motor. As such, the control system of the present invention is able to provide enhanced torque output using the remaining healthy phases of the motor, while also ensuring smooth operation under different types of open-phase faults, which is highly desirable.

Therefore, one advantage of the present invention is that a fault tolerant control system for a multi-phase permanent magnet assisted synchronous reluctance motor (PMa-SynRM) allows significant torque improvement to be achieved, as compared to existing methods, which further enhance the sustainable fault tolerant capabilities of the motor for reliable use in a variety of applications, such as electric vehicles and the aerospace industry.

Thus, it can be seen that the objects of the present invention have been satisfied by the structure and its method for use presented above. While in accordance with the Patent Statutes, only the best mode and preferred embodiment have been presented and described in detail, with it being understood that the present invention is not limited thereto or thereby. Accordingly, for an appreciation of the true scope and breadth of the invention, reference should be made to the following claims.

What is claimed is:

1. A method for controlling a multi-phase permanent magnet assisted synchronous reluctance motor comprising:
    detecting a fault in at least one phase of the motor, the motor having at least a first and a second healthy phase remaining;
    applying a phase current to each one of said first and second healthy phases to generate a torque at the motor;
    identifying an amplitude of said phase current applied to said first healthy phase, an amplitude of said phase current applied to said second healthy phase, a phase advance angle of said phase current applied to said first healthy phase, and a phase advance angle of said phase current applied to said second healthy phase, wherein said identifying step is performed sequentially;
    sequentially determining whether said amplitude of said phase current signal applied to said first and second healthy phases is less than a threshold value to be set, whether a zero sequence current of each said first and second phases are equal to zero, and whether the torque of the motor is equal to a torque value to be set;
    adjusting said amplitude and said phase angle of said phase current that is applied to each one of said first and second healthy phases, and repeating said identifying step in parallel, if said amplitude of said first and second healthy phases is not less than said threshold value to be set, or said zero sequence current applied to said first and second phases are not equal to zero, or the torque of the motor is not equal to said torque value to be.

2. The method of claim 1, wherein the multi-phase permanent magnet assisted synchronous reluctance motor has 5 phases.

3. The method of claim 1, wherein the fault is a single-phase open fault.

4. The method of claim 1, wherein the fault is a two-phase non-adjacent fault.

5. The method of claim 1, wherein the fault is a two-phase adjacent fault.

6. A control system for a multi-phase permanent magnet assisted synchronous reluctance motor having at least two phases under a fault condition and having at least one healthy phase, the motor being controlled by a pulse-width modulation (PWM) inverter component, the control system comprising:
    a speed controller to receive a speed setting signal, said speed controller adapted to be coupled to the motor to monitor the speed of the motor;
    a torque calculation component coupled to said speed controller;
    a fault tolerant algorithm component coupled to said torque calculation component, said fault tolerant algorithm component adapted to be coupled to the PWM inverter component; and
    a current sensor coupled to said fault tolerant component, said motor current sensor adapted to be coupled to the motor;
    wherein the fault tolerant algorithm component receives a torque setting signal from the torque calculation component and a current signal from the current sensor that identifies the current consumed by the motor, said fault tolerant algorithm component adjusts a vector control signal applied to the PWM inverter component, which includes an optimized torque angle signal and an optimized phase current signal that are applied to the at least one healthy phase, so as to control the motor to deliver maximum torque output during the fault, wherein said optimized torque angle signal and said optimized phase current signal are calculated by said fault tolerant algorithm component using both sequential and parallel analysis of a phase advance angle and an amplitude of said current signal.

7. The system of claim 6, wherein the multi-phase permanent magnet assisted synchronous reluctance motor has 5 phases.

8. The system of claim 6, wherein the fault condition is a single-phase open fault.

9. The system of claim 6, wherein the fault condition is a two-phase non-adjacent fault.

10. The system of claim 6, wherein the fault condition is a two-phase adjacent fault.

11. The system of claim 6, wherein the magnitude of said optimized phase current signals are optimized.

12. The system of claim 6, wherein the magnitude of said optimized phase current signal is optimized.

13. The system of claim 6, wherein the angle of said optimized phase current signal is optimized.

* * * * *

UNITED STATES PATENT AND TRADEMARK OFFICE
CERTIFICATE OF CORRECTION

PATENT NO. : 9,787,237 B2  
APPLICATION NO. : 14/797940  
DATED : October 10, 2017  
INVENTOR(S) : Seungdeog Choi et al.

Page 1 of 1

It is certified that error appears in the above-identified patent and that said Letters Patent is hereby corrected as shown below:

In the Claims

Claim 1, Column 13 Line 64 should read "of the motor is equal to a torque value to be set; and"

Signed and Sealed this
Twenty-eighth Day of November, 2017

Joseph Matal
*Performing the Functions and Duties of the
Under Secretary of Commerce for Intellectual Property and
Director of the United States Patent and Trademark Office*